(12) United States Patent
Mizuno

(10) Patent No.: US 7,911,183 B2
(45) Date of Patent: Mar. 22, 2011

(54) VOLTAGE CONTROL SYSTEM AND VEHICLE COMPRISING VOLTAGE CONTROL SYSTEM

(75) Inventor: Hideaki Mizuno, Owariasahi (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 624 days.

(21) Appl. No.: 11/988,309

(22) PCT Filed: Aug. 2, 2006

(86) PCT No.: PCT/IB2006/002100
§ 371 (c)(1),
(2), (4) Date: Jan. 4, 2008

(87) PCT Pub. No.: WO2007/015146
PCT Pub. Date: Feb. 8, 2007

(65) Prior Publication Data
US 2009/0039834 A1    Feb. 12, 2009

(30) Foreign Application Priority Data

Aug. 4, 2005 (JP) .................................. 2005-226496

(51) Int. Cl.
*H02J 7/00* (2006.01)
*H02J 7/14* (2006.01)
(52) U.S. Cl. ...................... 320/134; 320/104; 320/166
(58) Field of Classification Search .................. 320/104, 320/134, 166
See application file for complete search history.

(56) References Cited

U.S. PATENT DOCUMENTS

| 7,291,412 B2 * | 11/2007 | Kazama et al. ............... 429/430 |
| 2003/0118876 A1 | 6/2003 | Sugiura |
| 2004/0083039 A1 | 4/2004 | Hunt |
| 2004/0095087 A1 | 5/2004 | Hellstroem |
| 2005/0139399 A1 | 6/2005 | Gopal |

FOREIGN PATENT DOCUMENTS

| CN | 1396872 A | 2/2003 |
| JP | 05-151983 A | 6/1993 |
| JP | 2001-204107 A | 7/2001 |
| JP | 2001-234774 A | 8/2001 |
| JP | 2003-109627 A | 4/2003 |
| JP | 2004-152598 A | 5/2004 |

* cited by examiner

*Primary Examiner* — Edward Tso
*Assistant Examiner* — M'Baye Diao
(74) *Attorney, Agent, or Firm* — Kenyon & Kenyon LLP

(57) ABSTRACT

This voltage control system includes a power supply, an accumulator device which is capable of accumulating and discharging electrical power, a voltage control device which is constituted so as, when the electrical power supplied from the power supply is insufficient, to supplement it by discharging electrical power from the accumulator device, so as to keep a system voltage a predetermined value, and a control device which, when it has been recognized that the amount of electrical power required by one electrical power consumption device which is included in the system has decreased, reduces the rate of increase of the system voltage by implementing supply of electrical power from the power supply to the accumulator device.

13 Claims, 3 Drawing Sheets

F I G. 1
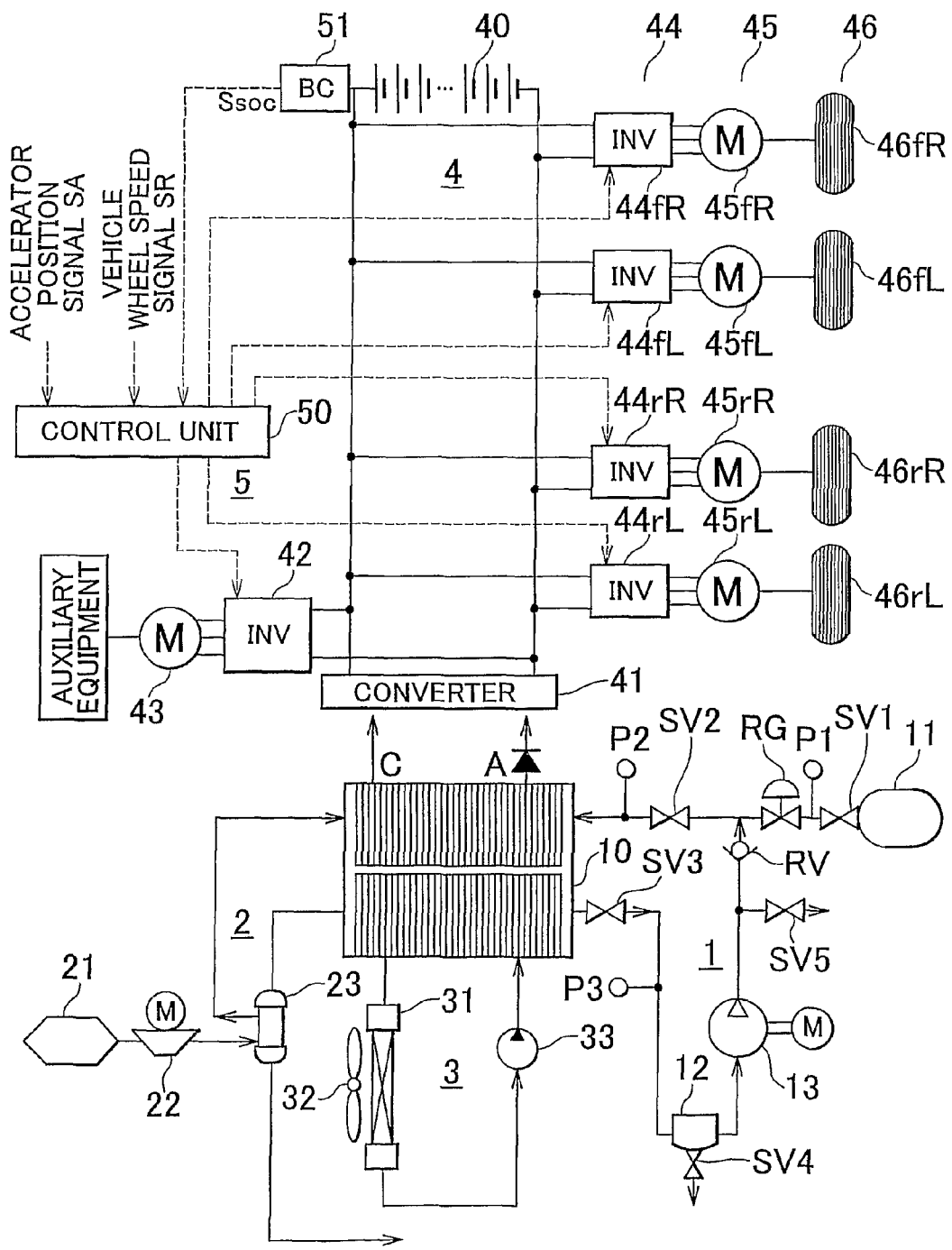

VOLTAGE CONTROL SYSTEM AND VEHICLE COMPRISING VOLTAGE CONTROL SYSTEM

This is a 371 national phase application of PCT/IB2006/002100 filed 2 Aug. 2006, claiming priority to Japanese Patent Application No. 2005-226496 filed 4 Aug. 2005, the contents of which are incorporated herein by reference.

BACKGROUND OF THE INVENTION

1. Field of the Invention

The present invention relates to a voltage control system and to a vehicle comprising the voltage control system.

2. Description of the Related Art

Recently, an electric automobile has been proposed which employs a fuel cell system or the like as a source of drive power for the vehicle. In an electric automobile, driving of the vehicle is implemented by electric motors being driven by electrical power supplied from the power supply, and by the drive wheels of the vehicle being rotated by the rotational force of these electric motors. Since the running stability of this electric automobile is deteriorated if free spinning (slippage) of a vehicle drive wheel occurs while it is running, accordingly recently, as for example disclosed in Japanese Patent Publication No. JP-A-2001-204107, there has been proposed a technique for enhancing the running stability of the vehicle by suppressing the drive force to a vehicle drive wheel if it has been detected that the drive wheel is spinning freely.

By the way, in such an electric automobile, it is usual to provide an accumulator device which supplies auxiliary electrical power, and which can accumulate or discharge electrical energy, in order on the one hand to store regenerated electrical power or surplus electrical power which is generated due to deceleration of the vehicle, and on the other hand to supplement any shortage of the electrical power supplied from the power supply. Moreover, sometimes a voltage control system is employed which is built so as, if a shortage of the electrical power supplied from the power supply occurs, by supplementing this power with electrical power discharged from the accumulator device, to maintain the system voltage at an approximately constant (for example at a predetermined value $V_0$, as shown in FIG. 3D).

With a system which maintains the system voltage at an approximately constant value in this manner, when, due to one of the drive wheels starting to spin freely, the amount of electrical power which is required (i.e. the electrical power consumption of the associated electric drive motor) increases abruptly, as shown in FIG. 3D, the system voltage temporarily decreases abruptly. Due to this, it is arranged to suppress abrupt reduction of the system voltage by supplying electrical power to the system by performing discharge from the accumulator device (as shown by the region indicated by diagonal lines in FIG. 3D).

However when, in the state in which it is arranged to suppress abrupt reduction of the system voltage by performing supply of electrical power from the accumulator device, the drive wheel which is in the freely spinning state touches the ground again and thus rapidly transits into the non-spinning state, since the rotational speed of this drive wheel decreases abruptly and accordingly the required amount of electrical power abruptly decreases, accordingly a state of affairs comes to pass in which the system voltage abruptly increases, as shown in FIG. 3D. When the system voltage abruptly changes in this manner, sometimes it happens that various types of problem can occur, such as deterioration of devices internal to the system, and the like.

SUMMARY OF THE INVENTION

The present invention takes as its object, with a voltage control system which is built so as, if there is a deficiency in the electrical power supplied from a power supply, to maintain the system voltage at an approximately constant level by supplementing electrical power discharged from an accumulator device, to solve the various problems which are caused due to abrupt changes of system voltage.

In order to attain this objective, according to one aspect thereof, the voltage control system according to the present invention includes: a power supply; an accumulator device which accumulates and discharges electrical power; a voltage control device which keeps a system voltage a predetermined value by discharging electrical power from the accumulator device when the electrical power supplied from the power supply is insufficient, or by charging electrical power to the accumulator device when the electrical power supplied from the power supply is surplus; and an electrical power transfer control device which controls the transfer of electrical power to and from the accumulator device so as to reduce the rate of change of the system voltage, when the amount of decrease or increase of electrical power required by one electrical power consumption device included in a system which utilizes the system voltage is greater than the predetermined amount.

Upon employment of the above described structure, if the amount of electrical power required by one electrical power consumption device decreases supply of electrical power from the power supply to the accumulator device is implemented by controlling electrical power transfer to the accumulator device, so that it is possible to reduce the rate of change of the system voltage. Accordingly, it becomes possible to solve the various problems which are caused by abrupt increase of the system voltage.

In this voltage control system, it would also be acceptable to arrange for the electrical power transfer control device to control the transfer of electrical power to and from the accumulator device so as to reduce the rate of change of the system voltage, when it has recognized that the required electrical power has reduced.

If this voltage control system is employed in an automobile which comprises a plurality of drive wheels, it would also be acceptable to arrange for it to include a plurality of electric motors, each of which drives one of the plurality of drive wheels and the one electrical power consumption device is one of the plurality of electric motors.

In this voltage control system, it would also be acceptable to arrange for the control device to increase the amount of electrical power which is supplied from the power supply to the accumulator device, the greater is the rate of reduction of the electrical power which is required by the one electrical power consumption device.

Furthermore, according to another aspect thereof, the voltage control system according to the present invention includes: a power supply; an accumulator device which accumulates and discharges electrical power; a voltage control device which keeps a system voltage a predetermined value by discharging electrical power from the accumulator device when the electrical power supplied from the power supply is insufficient; and an electrical power supply control device which implements electrical power supply from the power supply and/or the accumulator device to another electrical power consumption device which is included in a system which utilizes the system voltage, so as to reduce the rate of increase of the system voltage, when it has been recognized that the amount of electrical power required by one electrical power consumption device which is included in the system has decreased.

By employing the above described structure, it is possible to reduce the rate of increase of the system voltage by implementing electrical power supply from the power supply and/or the accumulator device to the other electrical power consumption device, when the amount of electrical power required by the one electrical power consumption device decreases. Accordingly, it becomes possible to solve the various problems which are caused by abrupt increase of the system voltage.

In this voltage control system, it would also be acceptable to arrange for the control device to increase the amount of electrical power which is supplied from the power supply and/or the accumulator device to the other electrical power consumption device, the greater is the rate of reduction of the electrical power which is required by the one electrical power consumption device.

Moreover, in this voltage control system, it would also be acceptable for the one electrical power consumption device to include an electric motor, and to arrange for the control device to recognize upon increase or decrease of the required electrical power, based upon increase or decrease of the electrical power consumption of this electric motor. Furthermore, it would also be possible for there to be included a drive wheel which is driven by such an electric motor, and to arrange for the control device to recognize upon increase or decrease of the required electrical power, based upon whether this drive wheel is in the freely spinning state or not. Yet further, it would also be possible to employ a fuel cell system as the power supply.

Furthermore, the vehicle according to the present invention is one which includes such a voltage control system. As such a vehicle to which the present invention may be applied, there may be cited an automobile, a ship, a robot, an aircraft, or the like.

Furthermore, according to yet another aspect thereof, the voltage control system according to the present invention includes: a power supply; an accumulator device which accumulates and discharges electrical power; a voltage control device which keeps a system voltage a predetermined value by discharging electrical power from the accumulator device when the electrical power supplied from the power supply is insufficient; and a rate of change reduction device which reduces the rate of change of the electrical power which is supplied from the power supply to a certain electrical power consumption device included in a system which utilizes the system voltage, when the electrical power required by the certain electrical power consumption device decreases.

By employing the above described structure, it is possible to suppress abrupt change of the system voltage, since it is possible to reduce the rate of change of the electrical power supplied from the power supply to the electrical power consumption device, when the amount of electrical power required by the certain electrical power consumption device included in the system decreases. Accordingly, it becomes possible to solve the various problems which are caused by abrupt increase of the system voltage.

According to the present invention, with a voltage control system which is built so as, if there is a deficiency in the electrical power supplied from a power supply, to maintain the system voltage at an accumulator device, it becomes possible to solve the various problems a predetermined value level by supplementing electrical power discharged from an which are caused by abrupt increase of the system voltage.

BRIEF DESCRIPTION OF THE DRAWINGS

The foregoing and further objects, features and advantages of the invention will become apparent from the following description of preferred embodiments with reference to the accompanying drawings, wherein like numerals are used to represent like elements and wherein:

FIG. 1 is a structural system diagram of a vehicle (an electric automobile) according to an embodiment of the present invention;

FIG. 3 is a set of time charts for explanation of this voltage control method performed by the voltage control system according to an embodiment of the present invention; herein.

DETAILED DESCRIPTION OF THE PREFERRED EMBODIMENTS

Figure 2:
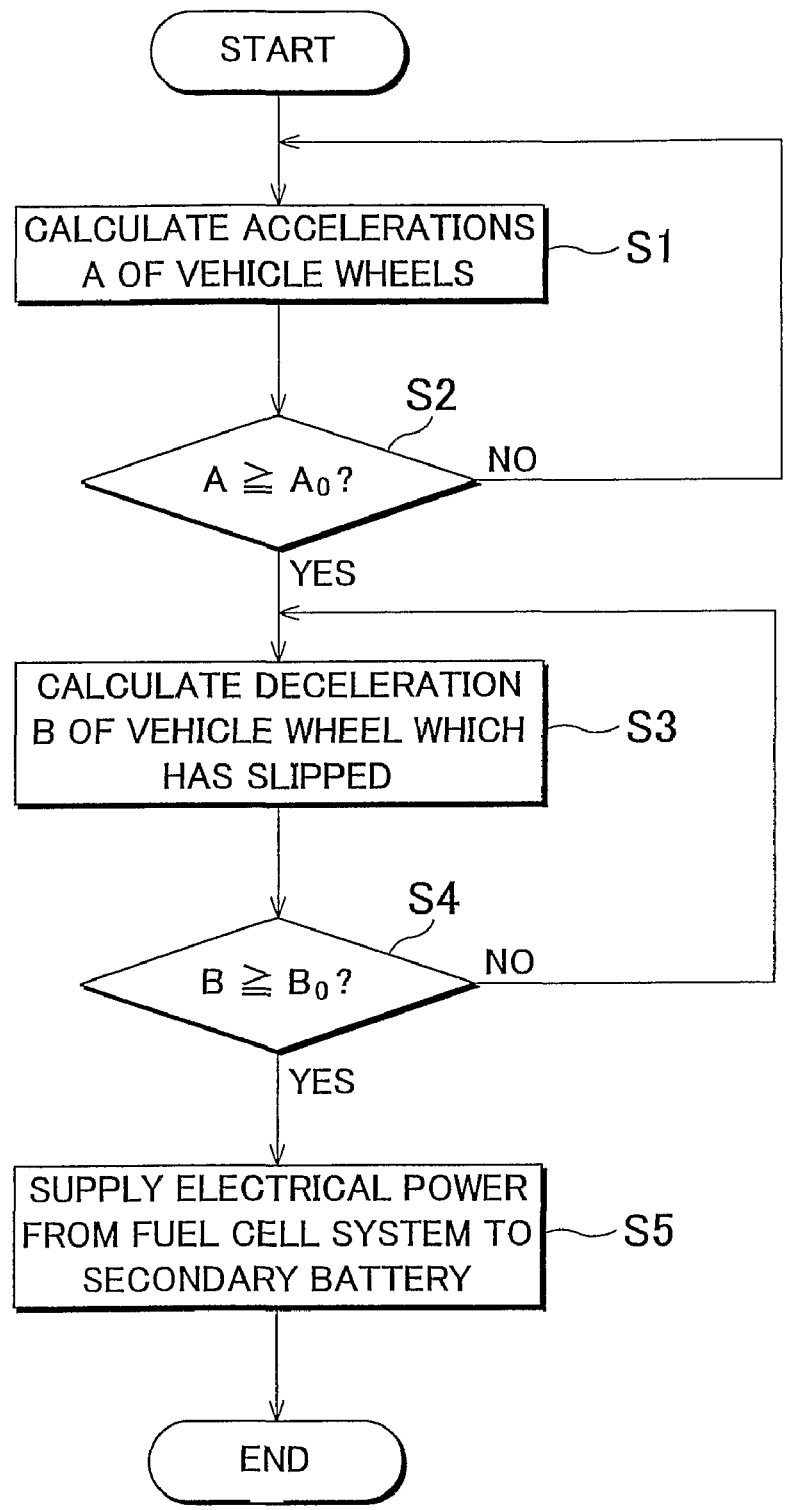
FIG. 2 is a flow chart for explanation of a voltage control method performed by a voltage control system according to an embodiment of the present invention.

In the following, a vehicle which is equipped with a voltage control system according to an embodiment of the present invention will be explained. In this embodiment, as an example of a vehicle according to the present invention, an electric automobile (a fuel cell car) in which a fuel cell system is employed as the power supply will be explained.

First, the structure of the electric automobile according to this embodiment will be explained with reference to FIG. 1. The electric automobile according to this embodiment, as shown in FIG. 1, is a four wheel drive vehicle which comprises an electrical power system 4, a control system 5, and a fuel cell system.

The electrical power system 4 comprises a secondary battery 40, a converter 41, an auxiliary equipment inverter (inverter for auxiliary equipment) 42, an auxiliary equipment motor (motor for auxiliary equipment) 43, auxiliary equipment, traction inverters 44fR, 44fL, 44rR, and 44rL (in the following, generically termed "traction inverters 44"), traction motors 45fR, 45fL, 45rR, and 45rL (in the following, generically termed "traction motors 45"), and vehicle wheels 46fR, 46fL, 46rR, and 46rL (in the following, generically termed "vehicle wheels 46"), This secondary battery 40 is one embodiment of the accumulator device in the present invention, and functions as an auxiliary power supply for the above described fuel cell system. The secondary battery 40 is made as a multi-layered battery module of the nickel-hydrogen type or the like, and, along with providing a supply of electrical power (discharge) at a predetermined voltage (for example 200V), also accumulates surplus electrical power. In other words, when the electrical power which is being demanded by the system (the system required electrical power) exceeds the maximum amount of electrical power which can be generated by the fuel cell system, this secondary battery 40 supplements this shortage amount of electrical power. Furthermore, when this electric automobile is decelerating and regenerated electrical power is being supplied by the traction motors 45, or when the amount of electrical power which is being generated by the fuel cell system is greater than the required electrical power so that surplus electrical power is being generated, then the secondary battery 40 is charged up by this regenerated electrical power or surplus electrical power. A battery computer 51 which will be described hereinafter is connected to the output terminals of this secondary battery 40.

The converter 41 is a voltage conversion device which converts electrical power which is inputted to its primary side (its input side) to power of a voltage value which is different from that of the primary side, and outputs this electrical power: for example, it may be a device which lowers the output voltage (for example 500 V) of the fuel cell 10 on its primary side to a lower voltage (for example around 200 V) on its secondary side. This converter 41 has a circuit structure which, for example, functions as a three phase bridge type converter. As such a three phase bridge type converter circuit structure, it is possible to employ a combination of a circuit portion resembling an inverter which temporarily converts the DC voltage which is inputted to AC, and another portion which rectifies this AC so as to convert it back into a different DC voltage. It is arranged to be able to measure the input and output currents and input and output voltages of the converter 41 by current and voltage sensors not shown in the figure.

The auxiliary equipment inverter 42 outputs three phase AC electrical power according to a drive signal from a control unit 50, so that the auxiliary equipment motor 43 is driven at a torque which is set in correspondence thereto. This auxiliary equipment inverter 42 may, for example, have a circuit structure of a PWM inverter type which comprises switching elements such as IGBTs (Insulated Gate Bipolar Transistors) or the like, and converts the DC supplied from the secondary side of the electrical power system 4 to three phase AC electrical power of any desired amplitude, so as to supply it to the auxiliary equipment motor 43. This auxiliary equipment motor 43 is a so called AC synchronous motor which converts electrical energy which is supplied as three phase AC from the auxiliary equipment inverter 42 into rotational force (torque) corresponding thereto, which it transmits to auxiliary equipment. "Auxiliary equipment" is a generic term for various types of auxiliary equipment driven by this auxiliary equipment motor 43. As examples of such auxiliary equipment, there may be cited a hydrogen pump 13, a compressor 22, a fan for cooling 32, and so on, as will be described hereinafter.

It should be understood that, in this embodiment, no system voltage detection circuit is provided to the auxiliary equipment inverter 42 or the auxiliary equipment motor 43; rather, the auxiliary equipment inverter 42 controls the pulse width of the current for driving the auxiliary equipment motor 43, based upon the differential between the actual motor speed of the auxiliary equipment motor 43, and its target rotational speed. Accordingly, if the system voltage should increase abruptly, it may happen that an excessive current flows to the auxiliary equipment motor 43 due to control lag in the auxiliary equipment inverter 42, so that there is a failure of the auxiliary equipment.

The traction inverters 44 and the traction motors 45 are devices provided corresponding to each of the vehicle wheels of this electric automobile (which is a four wheel drive vehicle), and they include: an inverter 44fR and a motor 45fR for the front vehicle wheel 46fR on the right side; an inverter 44fL and a motor 45fL for the front vehicle wheel 46fL on the left side; an inverter 44rR and a motor 45rR for the rear vehicle wheel 46rR on the right side; and an inverter 44rL and a motor 45rL for the rear vehicle wheel 46rL on the left side. Each of these traction inverters 44 outputs an independent three phase AC according to a drive signal from the control unit 50, and each of the traction motors 45 is thus driven at a torque which is set independently in correspondence thereto.

Each of the traction inverters 44 may have a PWM inverter type circuit structure comprising switching elements such as, for example, the above described IGBTs or the like, and they are arranged, during acceleration, to convert DC electrical power which is supplied from the secondary side of the electrical power system 4 into three phase AC electrical power of any desired amplitude, which they supply to their respective traction motors 45. Furthermore they are arranged, during deceleration, to be capable of converting the regenerated three phase AC electrical power which is supplied from their respective traction motors 45 to DC corresponding thereto, which they supply to the secondary battery 40.

Each of these traction motors 45 is a so called AC synchronous motor, and, during acceleration, they convert the electrical energy which is supplied to them as three phase AC from their respective traction inverters 44 into rotational forces (torques) corresponding thereto, thus causing their respective vehicle wheels 46 to rotate, and thus propelling the electric automobile. Furthermore they are arranged, during deceleration, to convert the rotational force of their respective vehicle wheels 46 into electrical energy so as to generate regenerated electrical power, thereby exerting regenerative braking force upon the vehicle wheels 46. These traction motors 45 and vehicle wheels 46 are each embodiments of the electric motor and the drive wheel of the present invention. Furthermore, the traction motors 45 are examples of the "certain electrical power consumption device" and the "one electrical power consumption device" in the claims.

Next, the control system 5 will be explained. This control system 5 comprises a control unit 50, the battery computer (BC) 51, and the like. The control unit 50 is a computer system which comprises a CPU, a memory, interface circuits and the like, none of which are shown in the figures; and, by this CPU sequentially executing various types of program which are stored in the memory, the control unit 50 performs integrated overall control of various types of electronic device incorporated in this electric automobile.

In concrete terms, if the electrical power which is supplied from the fuel cell system is insufficient for the required electrical power by an electrical power consumption device, the control unit 50 supplements it by discharging electrical power from the secondary battery 40, thus keeping the system voltage a predetermined value. This predetermined value is decided, referring to the voltage/current characteristics of a power supply or an accumulator device, or referring to the required electrical power by an electrical power consumption device, for example. The predetermined value can be decided, referring to the hysteresis characteristics of the electrical power consumption device. Such a system voltage is applied to the electrical power consumption device. Furthermore, if the control unit 50 has recognized to reduce the electrical power demanded by the traction motors 45 included in the system, each of which is an example of the "certain electrical power consumption device" (or the "one electrical power consumption device") in the claims, then it controls electrical power transfer to the secondary battery, thus implementing supply of electrical power from the fuel cell system to the secondary battery, and reduces the rate of change (the rate of increase) of the supply of electrical power from the fuel cell system to the traction motors 45, thus reducing the rate of increase of the system voltage. In other words, the control unit 50 functions as an embodiment of the voltage control device in the present invention. It should be understood that the control unit 50 of this embodiment is constructed so as to increase the amount of electrical power which is supplied from the fuel cell system to the secondary battery 40, the greater is the rate of reduction of the electrical power required by the traction motors 45.

Furthermore, the control unit 50 of this embodiment recognizes whether to increase or to decrease the required electrical power, based upon whether or not the vehicle wheels 46 are in the freely spinning (slippage) state. For example, if it has detected that a vehicle wheel 46 which is in the freely spinning state has contacted the ground and has shifted into the non-freely spinning state, then it recognizes that the rotational speed of the traction motor 45 reduces so that the required electrical power reduces. It should be understood that it would also be possible, not actually directly to detect that the vehicle wheels 46 are in the freely spinning state, but instead to recognize upon increase or reduction of the required electrical power, based upon increase or decrease of the electrical power consumption of the traction motors 45.

Detection signals from various sensors and the like, not shown in the figures, for measuring the operational state and the running state of this electric automobile are inputted to the control unit 50. For example, the operational state of an accelerator pedal which is actuated by being stepped upon by the driver is detected by an accelerator position sensor, and is inputted to the control unit 50 as an accelerator position signal Sa. Furthermore, the rotational speed of each of the vehicle wheels 46 of this electric automobile is detected by a vehicle wheel speed sensor which is provided to that vehicle wheel 46, and is inputted to the control unit 50 as a vehicle wheel speed signal Sr. As such a vehicle wheel speed sensor, it would be possible to utilize a speed sensor, or an current sensor which detects the drive current of the corresponding motor.

The battery computer 51 controls the state of charge (SOC) of the secondary battery 40, so as to maintain it in an appropriate range. For example, on the one hand, when during acceleration or the like a device of high electrical power consumption is operated, this battery computer 51 discharges electrical power from the secondary battery 40 in order to supply the amount by which the electrical power of the fuel cell system is deficient; while, during deceleration, it charges the regenerated electrical power which is generated by regenerative braking into the secondary battery 40. The battery computer 51 detects the voltage, the temperature, the current, the temperature of the ambient atmosphere and so on for each of the cells which make up the secondary battery 40, integrates the amounts of charge and discharge of the secondary battery and so on, and thereby produces a detection signal $S_{SOC}$ which indicates the charge state as an SOC value, which is a relative value indicating the charge state, and outputs this detection signal $S_{SOC}$ to the control unit 50.

Next the fuel cell system, which is the power supply, will be explained. This fuel cell system is a system for supplying electrical power to the electrical power system 4, and comprises a fuel gas supply system 1, an oxidant gas supply system 2, and a cooling system 3, all centering around the fuel cell 10.

This fuel cell 10 has a stacked structure made from a plurality of superimposed layers, each being a single cell comprising separators having flow conduits for hydrogen gas which is the fuel gas, air which is the oxidant, and cooling water, and Membrane Electrode Assembly (MEA) which is sandwiched between each pair of separators. These membrane electrode assemblies have a structure in which a macromolecular electrolyte layer is sandwiched between an anode electrode and a cathode electrode. In the anode electrode, a catalyst layer for the anode is provided upon a porous support layer, and likewise, in the cathode electrode, a catalyst layer for the cathode is provided upon a porous support layer. Hydrogen gas is supplied from the fuel gas supply system 1 to the side of the anode electrode, while air is supplied from the oxidant gas supply system 2 to the side of the cathode electrode. By individual cells being connected in series in this fuel cell 10, a predetermined high voltage (for example around 500 V) is generated between an anode electrode A and a cathode electrode C, which constitute the output terminals, and this high pressure voltage is supplied as the primary side input of the converter 41 of the electrical power system 4.

The fuel gas supply system 1 is a system for supplying hydrogen gas into the fuel cell 10, and comprises a hydrogen tank 11, a cutoff valve SV1, a regulator RG, a fuel cell inlet cutoff valve SV2, a fuel cell outlet cutoff valve SV3 at the other side of the fuel cell 10, a gas-liquid separator 12 (and a cutoff valve SV4), a hydrogen pump 13, a purge cutoff valve SV5, and a non-return valve RV. Although a certain portion of the hydrogen gas which is exhausted from the fuel cell 10 is purged to the purge cutoff valve SV5 and is exhausted to the exterior, it is arranged to return the remainder thereof back to the fuel gas flow conduit via the non-return valve RV.

The hydrogen tank 11 is constructed as a high pressure hydrogen tank. The cutoff valve SV1 is the main valve which controls whether or not hydrogen gas is supplied to the fuel gas flow conduit. The regulator RG1 is a regulation valve which regulates the pressure of the hydrogen gas in the circulation path. The cutoff valve SV3 is a cutoff valve which is used when stopping the supply of hydrogen gas to the fuel cell 10. The cutoff valve SV4 is a valve which is used for controlling the exhaust of hydrogen off-gas from the fuel cell 10. The gas-liquid separator 12 is a device which eliminates water and other impurities in the hydrogen off-gas, generated due to the electro-chemical reactions in the fuel cell 10 during normal operation, and emits them to the exterior via the cutoff valve SV4. The hydrogen pump 13 forcibly circulates the hydrogen gas around its circulation path. The purge cutoff valve SV5 is opened during purging, but is kept closed in the normal operational state, and when it has been recognized that gas leakage has in a distribution conduit is occurring. The hydrogen off-gas which has been purged from the purge cutoff valve SV5 is processed in an exhaust system, not shown in the figure, which includes a diluter. The non-return valve RV prevents reverse flow of hydrogen gas in its circulation path.

The oxidant gas supply system 2 is a system which supplies air, which is the oxidant gas, to the fuel cell 10, and it comprises an air cleaner 21, a compressor 22, a humidifier 23, and so on. The air cleaner 21 is a device for cleaning the air which is taken into the fuel cell system. The compressor 22 compresses the air which is thus taken in according to control by the control unit 50, and which can change the amount of air which is supplied and the pressure thereof. The humidifier 23 increases the humidity of this compressed air by performing exchange of water component with the air vent gas. The air vent gas which has been exhausted from the fuel cell 10 and has been dehumidified by the humidifier 23 is diluted by the hydrogen off-gas from the purge cutoff valve SV5 in the diluter not shown in the figures, and is then exhausted.

The cooling system 3 comprises a radiator 31, the fan 32, and a coolant pump 33, and thereby coolant liquid is supplied into and is circulated within the interior of the fuel cell 10. In concrete terms, this coolant liquid enters into the fuel cell 10 and is supplied via a manifold (not shown) into the individual cells, and flows to the coolant liquid flow conduits of their separators, thus being arranged to take away the heat which is created along with the generation of electrical power.

It should be understood that the voltage control system according to this embodiment comprises the electrical power system 4 which includes the secondary battery 40 (which can be regarded as the "accumulator device" in the claims) and the traction motors 45 (which can be regarded as the "certain electrical power consumption device" and the "one electrical power consumption device" in the claims), the control system 5 which includes the control unit 50 (which can be regarded as the "control device" of the claims), and the fuel cell system (which can be regarded as to the "power supply" of the claims).

Next, the voltage control method implemented by the voltage control system according to this embodiment of the present invention will be explained using the flow chart shown in FIG. 2 and the time charts shown in FIGS. 3A to 3C. It should be understood that it is supposed that, before implementing this method, as shown in FIG. 3C, the system voltage is being maintained at a predetermined value $V_0$. Furthermore, initially, it is supposed that a voltage according to electrical power supply from the fuel cell system is being employed as the system voltage, and that discharge of electrical power from the secondary battery 40 is not being performed.

First, the control unit 50 of this electric automobile, along with calculating, based upon the vehicle wheel speed signals Sr which are detected by the vehicle wheel speed sensors, vehicle wheel vehicle speeds (i.e., vehicle body speeds which are calculated based upon the vehicle wheel rotational speeds), in other words, a right front wheel vehicle speed VfR, a left front wheel vehicle speed VfL, a right rear wheel vehicle speed VrR, and a left rear wheel vehicle speed VrL, also calculates the amounts of increase per unit time (i.e. the accelerations) A of them (in an acceleration calculation process: the step S1). And it recognizes whether or not any of these accelerations A for the vehicle wheels 46 is greater than or equal to a predetermined value $A_0$ (in a slippage decision process: the step S2).

If, in the slippage decision process of the step S2, the control unit 50 has recognized that, for all of the vehicle wheels 46, the acceleration A is less than the predetermined value $A_0$ (NO in the step S2), then the flow of control returns back to the acceleration calculation process of the step S1. On the other hand if, in the slippage decision process of the step S2, the control unit 50 has recognized that, for example, the acceleration A of the front vehicle wheel on the right side 46fR is greater than or equal to the predetermined value $A_0$ (YES in the step S2), then this is taken as meaning that slippage of this vehicle wheel 46fR is taking place, and the flow of control proceeds to the next process (in an deceleration calculation process: the step S3). In this deceleration calculation process S3, the deceleration of the vehicle wheel which has slipped is calculated.

Figure 3A:
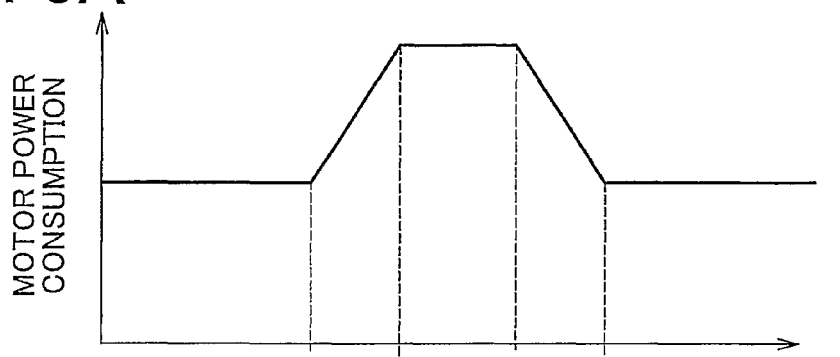
FIG. 3A shows the electrical power consumed by a traction motor.
Figure 3B:
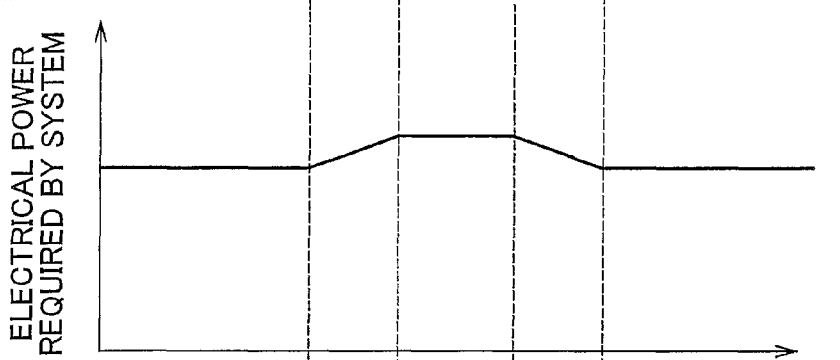
FIG. 3B shows the electrical power required by the system.
Figure 3C:
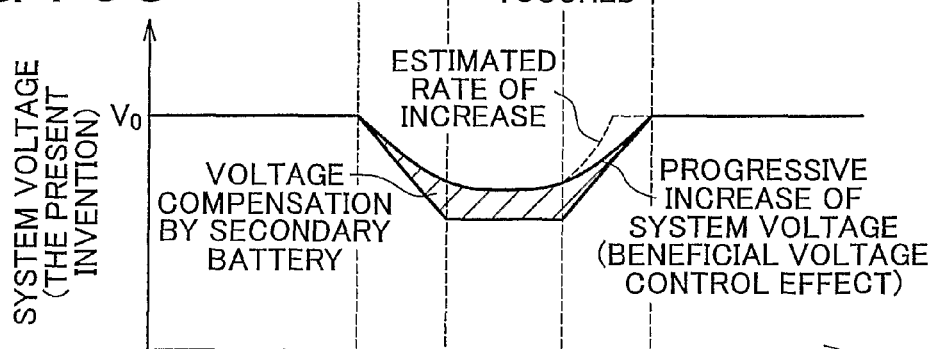
FIG. 3C shows the system voltage when this system according to an embodiment of the present invention is employed.
Figure 3D:
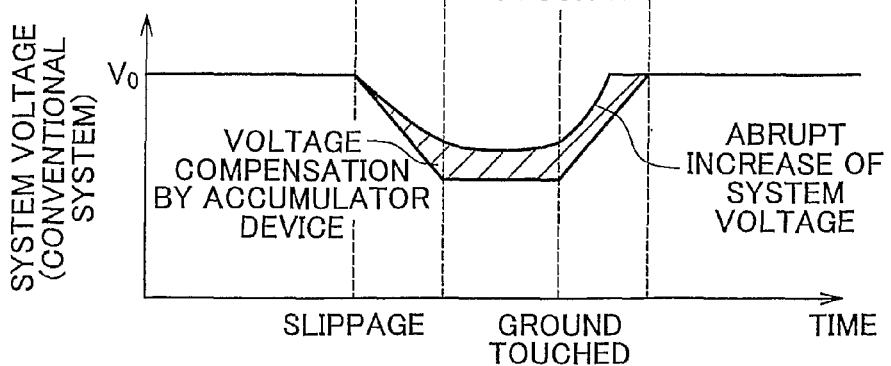
FIG. 3D shows the system voltage when a conventional system is employed.

Since, if slippage of the vehicle wheel 46fR has taken place, the rotational speed of that vehicle wheel 46fR increases abruptly, accordingly, as shown in FIG. 3A, the amount of electrical power consumed by the corresponding traction motor 45fR increases abruptly, and, as shown in FIG. 3B, the amount of electrical power required by the system (the required electrical power) also increases. Moreover, as shown in FIG. 3C, the system voltage is temporarily reduced abruptly, since the amount of electrical power which is consumed by the traction motor 45fR increases abruptly (i.e. the required electrical power increases abruptly) due to the occurrence of slippage. In order to compensate for this type of sudden reduction of the system voltage, the control unit 50 supplies the electrical power of the secondary battery 40 to the system (this corresponds to the region shown by sloping lines in FIG. 3C).

Next if, in the slippage decision process of the step S2, the control unit 50 has recognized that, for example, slippage of the front vehicle wheel on the right side 46fR has occurred, then, along with calculating the vehicle wheel vehicle speed (the right front wheel vehicle speed VfR) of this vehicle wheel 46fR for which slippage has occurred based upon the vehicle wheel speed sensor signal Sr as detected by the corresponding vehicle wheel speed sensor, it also calculates (in a deceleration calculation process: the step S3) the rate of decrease B thereof per unit time (i.e. the deceleration). And the control unit 50 makes a decision as to whether or not this deceleration B of this vehicle wheel 46fR on which slippage has occurred is greater than or equal to a predetermined value $B_0$ (in a ground touching decision process: the step S4).

If, in the touching ground decision process of the step S4, the control unit 50 has recognized that, for the vehicle wheel 46fR which had previously been slipping, the deceleration B is less than the predetermined value $B_0$ (NO in the step S4), then next the flow of control loops back to the deceleration calculation process of the step S3. On the other hand if, in the touching ground decision process of the step S4, the control unit 50 has recognized that the deceleration B of the vehicle wheel 46fR which had previously been slipping is greater than or equal to the predetermined value $B_0$ (YES in the step S4), then this is taken as meaning that the state in which slippage of this vehicle wheel 46fR is taking place has ceased since it has now touched ground, and the flow of control proceeds to the next process (in the voltage control process: the step S5).

Since the rotational speed of the vehicle wheel 46fR abruptly decreases when this vehicle wheel 46fR touches ground and its state of slipping is eliminated, accordingly, as shown in FIG. 3A, the amount of electrical power consumed by the corresponding traction motor 45fR abruptly decreases, and thus, as shown in FIG. 3B, the amount of electrical power required by the system (the system required electrical power) also comes to be reduced. On the other hand, since the amount of electrical power consumed by the traction motor 45fR abruptly reduces (the system required electrical power abruptly reduces) due to the termination of its slipping state, accordingly, as shown in FIG. 3C, the system voltage temporarily increases abruptly. It is because the control unit 50 controls so as to supply the electrical power from the secondary battery 40 in order to compensate for this abrupt increase in system voltage. This type of abrupt increase in the system voltage is not desirable, since it may entail various types of problem, such as failure of the auxiliary equipment, or the like.

Thus, if the control unit 50 has detected in the touching ground decision process of the step S4 that the state of slippage of the front vehicle wheel on the right side 46fR has ceased, along with stopping the supply (the discharge) of electrical power from the secondary battery 40, it also (in the voltage control process: the step S5) implements electrical power supply into the secondary battery 40 from the fuel cell system. By implementing this voltage control process of the step S5, it is possible to prevent the system voltage from increasing abruptly from the touching ground time point of this vehicle wheel 46fR.

It should be understood that, in this embodiment, at the time point that it has recognized that the slippage state of the vehicle wheel 46fR has ceased, the control unit 50 estimates the rate of increase of the system voltage (the abrupt tendency shown by the broken line in FIG. 3C), and determines the amount of electrical power that should be supplied from the fuel cell system to the secondary battery 40 according to this estimated rate of increase. After this, the control unit 50 elevates the system voltage gently up to the initial predetermined value $V_0$, and then ceases this control operation.

With the voltage control system for the electric automobile of this embodiment as explained above, when the amount of electrical power required by one electrical power consumption device (for example, by the traction motor 45/R) reduces (for example, when the amount of electrical power consumed by the traction motor 45/R reduces due to the state of slippage of its vehicle wheel 46/R ceasing), it is possible to reduce the rate of increase of the system voltage by implementing supply of electrical power from the fuel cell system to the secondary battery 40. Accordingly, it becomes possible to suppress deterioration of the auxiliary equipment (the hydrogen pump 13, the compressor 22, the fan for cooling 32, and so on) which might be caused by an abrupt increase in the system voltage.

It should be understood that although, in the voltage control system for an electric automobile according to the embodiment explained above, the traction motor 45/R is cited as one example of the "certain electrical power consumption device" of the claims for performing voltage control, it would also be possible to perform similar voltage control for various other types of electrical power consumption device as other examples of the "certain electrical power consumption device" of the claims, excluding the secondary battery 40 (such as, for example, the other traction motors, a heat generation device such as a heater or the like, a light generation device such as the running lights or the like, a voice generation device such as an audio device or the like)

Furthermore although, in the various embodiments described above, it is shown by way of example that the rate of increase of the system voltage is reduced by controlling electrical power transfer to and from the secondary battery 40, when it is recognized that the amount of electrical power required by one of the electrical power consumption devices (i.e. by one of the traction motors 45) decreased, it would also be possible to reduce the rate of increase of the system voltage by some other means.

For example it would also be possible, if it has been recognized that the amount of electrical power required by one electrical power consumption device has decreased, for the control unit 50 to reduce the rate of increase of the system voltage by implementing supply of electrical power from the fuel cell system and/or the secondary battery 40 to some other electrical power consumption device not shown in the figures (which might be any other electrical power consumption device apart from the secondary battery 40, like, for example, a heat generation device such as a heater or the like). In such a case, it would also be acceptable to increase the amount of electrical power supplied to that other electrical power consumption device from the fuel cell system and/or the secondary battery 40, the greater is the rate of reduction of the amount of electrical power required by the one electrical power consumption device.

Furthermore although, in the various embodiments described above, the traction motors 45 are cited as examples of the "certain electrical power consumption device" of the claims for performing voltage control, it would also be possible to consider the secondary battery 40 (can be regarded as the "accumulator device" in the claims) as being an example of the "certain electrical power consumption device" in the claims. In other words it would be possible, if the amount of electrical power required by the secondary battery 40 decreases, for the control unit 50 to implement supply of electrical power from the fuel cell system to some other electrical power consumption device (for example a heat generation device such as a heater or the like), so as to reduce the rate of change (the rate of increase) of the electrical power supplied from the fuel cell system to the secondary battery 40.

By doing this, it would be possible to reduce the rate of change (the rate of increase) of the system voltage.

Furthermore although, in the embodiments described above, it is shown by way of example that a fuel cell system is employed as the power supply, this is not to be considered as being limitative of the present invention; for example, it would also be possible to employ a secondary battery (such as a nickel-hydrogen battery or a lithium ion battery or the like) or a capacitor as the power supply. Furthermore although, in the embodiments described above, it is shown, by way of example, that a secondary battery is employed as the accumulator device, it would also be acceptable to arrange to employ a capacitor as the accumulator device.

Furthermore although, in the embodiments described above, it is shown by way of example that the rate of increase of the system voltage is reduced by implementing supply of electrical power from the power supply (the fuel cell system) to the accumulator device (the secondary battery), when the amount of electrical power required by one electrical power consumption device included in the system (one of the traction motors 45) decreased, it would also be possible to reduce the rate of change (the rate of reduction) of the system voltage by implementing supply of electrical power from the accumulator device, when the amount of electrical power required by one electrical power consumption device increases. By doing this, it would become possible to solve various problems which are caused by abrupt reduction of the system voltage.

Furthermore although, in the embodiments described above, the application of the present invention to an electric automobile (a fuel cell vehicle) which is equipped with a fuel cell system as a power supply is shown by way of example, it would also be possible to apply the present invention to an electric automobile which is equipped with some system other than a fuel cell system as its power supply.

Furthermore although, in the embodiments described above, the application of the present invention to a four wheel drive vehicle in which each of the front and rear left and right vehicle wheels is driven by its own individual traction motor is shown by way of example, it goes without saying that it would also be possible to apply the present invention to a two wheel drive vehicle, a three wheel drive vehicle, or to a large sized vehicle having more than four drive wheels or the like.

Furthermore although, in the embodiments described above, there are at least two states, that is, in one state the rate of change of the system voltage is controlled to be reduced (limited), in the other state the rate of change of the system voltage is controlled not to be reduced, the control unit 50 may control the transfer of electrical power to and from the secondary battery 40 (an accumulator device) so as to reduce the rate of change of the system voltage, when the amount of decrease or increase of electrical power required by one electrical power consumption device included in a system which utilizes the system voltage is greater than the predetermined amount. The predetermined amount is determined, referring to the capability of the electrical power consumption device, for example. In addition, "the amount" of decrease or increase does not necessarily mean "the rate" of decrease or increase.

Furthermore although, in the embodiment described above, the application of the present invention to an electric automobile has been shown by way of example, this is not limitative; the present invention could also be applied to some other type of vehicle (for example a ship, a robot, an aircraft or the like) including a system constructed so as to maintain a system voltage at a predetermined value level.

While the invention has been described with reference to embodiments thereof, it is to be understood that the invention is not limited to the embodiments or constructions. To the contrary, the invention is intended to cover various modifications and equivalent arrangements. In addition, while the various elements of the embodiments are shown in various combinations and configurations, which are exemplary, other combinations and configurations, including more, less or only a single element, are also within the spirit and scope of the invention.

The invention claimed is:

1. A voltage control system, comprising:
a power supply;
an accumulator device which accumulates and discharges electrical power;
a voltage control device which controls a system voltage to a predetermined value by discharging electrical power from the accumulator device when the electrical power supplied from the power supply is insufficient or by charging electrical power to the accumulator device when the electrical power supplied from the power supply is surplus; and
an electrical power transfer control device which controls the transfer of electrical power to and from the accumulator device so as to slow the rate of change of the system voltage that is controlled to the predetermined value by the voltage control device, when the amount of decrease or increase of electrical power required by one electrical power consumption device included in a system which utilizes the system voltage is greater than the predetermined amount.

2. The voltage control system according to claim 1, wherein the electrical power transfer control device controls the transfer of electrical power to and from the accumulator device so as to reduce the rate of change of the system voltage, when it has recognized that the required electrical power has reduced.

3. The voltage control system according to claim 2, wherein the power supply is a fuel cell system.

4. The voltage control system according to claim 1, wherein the control device increases the amount of electrical power which is supplied from the power supply to the accumulator device, the greater is the rate of reduction of the electrical power which is required by an electrical power consumption device that utilizes the system voltage.

5. A vehicle comprising the voltage control system according to claim 2.

6. The voltage control system according to claim 1, further comprising:
a slippage determination device configured to determine whether a vehicle wheel is in a slippage state, wherein the slippage determination device determines the slippage state when a vehicle wheel acceleration is greater than or equal to a predetermined acceleration; and
a slippage end determination device configured to determine whether a vehicle wheel is in a slippage end state in which the vehicle wheel has stopped slipping, wherein the slippage end determination device determines the slippage end state when the deceleration of a vehicle wheel in a slippage state is greater than or equal to a predetermined deceleration,
wherein, when the slippage state is determined, the electrical power transfer control device controls the transfer of electrical power to reduce the rate of decrease of the system voltage, and
wherein, when the slippage end state is determined, the electrical power transfer control device controls the transfer of electrical power to reduce the rate of increase of the system voltage.

7. A voltage control system, comprising:
a power supply;
an accumulator device which accumulates and discharges electrical power;
a voltage control device which controls a system voltage to a predetermined value by discharging electrical power from the accumulator device when the electrical power supplied from the power supply is insufficient; and
an electrical power supply control device which implements electrical power supply from the power supply and/or the accumulator device to another electrical power consumption device which is included in a system which utilizes the system voltage, so as to slow the rate of increase of the system voltage that is controlled to the predetermined value by the voltage control device, when it has been recognized that the amount of electrical power required by one electrical power consumption device which is included in the system has decreased.

8. The voltage control system according to claim 7, wherein the control device increases the amount of electrical power which it supplies from the power supply and/or the accumulator device to the other electrical power consumption device, the greater is the rate of reduction of the electrical power required by an electrical power consumption device that utilizes the system voltage.

9. The voltage control system according to claim 7, wherein the power supply is a fuel cell system.

10. A vehicle comprising the voltage control system according to claim 7.

11. The voltage control system according to claim 7, further comprising:
a slippage end determination device configured to determine whether a vehicle wheel is in a slippage end state in which the vehicle wheel has stopped slipping, wherein the slippage end determination device determines the slippage end state when the deceleration of a vehicle wheel that has slipped is greater than or equal to a predetermined deceleration,
wherein, when the slippage end state is determined, the electrical power supply control device implements electrical power supply from the power supply and/or the accumulator device to another electrical power consumption device to reduce the rate of increase of the system voltage.

12. A voltage control system, comprising:
a power supply;
an accumulator device which accumulates and discharges electrical power;
a voltage control device which controls a system voltage to a predetermined value by discharging electrical power from the accumulator device when the electrical power supplied from the power supply is insufficient; and
a rate of change reduction device which slows the rate of change of the electrical power which is supplied from the power supply to a certain electrical power consumption device included in a system which utilizes the system voltage that is controlled to the predetermined value by the voltage control device, when the electrical power required by the certain electrical power consumption device decreases.

13. The voltage control system according to claim 12, further comprising:
a slippage end determination device configured to determine whether a vehicle wheel is in a slippage end state in which the vehicle wheel has stopped slipping, wherein the slippage end determination device determines the slippage end state when the deceleration of a vehicle wheel that has slipped is greater than or equal to a predetermined deceleration, wherein, when the slippage end state is determined, the rate of change reduction device reduces the rate of change of electrical power supplied from the power supply to the certain electrical power consumption device to reduce the rate of increase of the system voltage.

* * * * *